United States Patent
Gan et al.

(10) Patent No.: US 6,926,991 B2
(45) Date of Patent: Aug. 9, 2005

(54) SVO/CF$_X$ PARALLEL CELL DESIGN WITHIN THE SAME CASING

(75) Inventors: Hong Gan, East Amherst, NY (US); Esther S. Takeuchi, East Amherst, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 324 days.

(21) Appl. No.: 10/328,391

(22) Filed: Dec. 23, 2002

(65) Prior Publication Data

US 2003/0129484 A1 Jul. 10, 2003

Related U.S. Application Data

(60) Provisional application No. 60/344,701, filed on Dec. 26, 2001.

(51) Int. Cl.[7] .................. H01M 10/44; H01M 4/34; H01M 4/48; H01M 4/58; H01M 6/16
(52) U.S. Cl. .................. 429/52; 429/219; 429/220; 429/221; 429/223; 429/224; 429/231.3; 429/231.5; 429/231.7; 429/231.95; 429/326
(58) Field of Search .................. 429/128, 245, 429/219, 231.95, 231.7, 326, 328, 329, 330, 231.5, 224, 223, 231.3, 220, 221, 52

(56) References Cited

U.S. PATENT DOCUMENTS

| | | | |
|---|---|---|---|
| 5,569,553 A | 10/1996 | Smesko et al. | 429/90 |
| 5,614,331 A | 3/1997 | Takeuchi et al. | 429/9 |
| 5,639,577 A | 6/1997 | Takeuchi et al. | 429/219 |
| 5,667,910 A | 9/1997 | Takeuchi et al. | 429/128 |
| 5,667,916 A | 9/1997 | Ebel et al. | 429/218 |
| 5,744,258 A | 4/1998 | Bai et al. | |
| 5,935,724 A | 8/1999 | Spillman et al. | 429/9 |
| 5,935,728 A | 8/1999 | Spillman et al. | 429/94 |
| 6,165,638 A | 12/2000 | Spillman et al. | 429/94 |
| 6,171,729 B1 | 1/2001 | Gan et al. | 429/231.95 |
| 6,258,473 B1 | 7/2001 | Spillman et al. | 429/9 |

*Primary Examiner*—Patrick Joseph Ryan
*Assistant Examiner*—Thomas H. Parsons
(74) *Attorney, Agent, or Firm*—Michael F. Scalise

(57) ABSTRACT

A new cathode design has a first cathode active material of a relatively low energy density but of a relatively high rate capability contacted to a first cathode current collector and a second cathode active material having a relatively high energy density but of a relatively low rate capability in contact with a second cathode current collector, is described. The first and second cathode current collectors are connected to a common terminal lead. The present cathode design is useful for powering an implantable medical device requiring a high rate discharge application.

31 Claims, 2 Drawing Sheets

SVO/CF$_x$ PARALLEL CELL DESIGN WITHIN THE SAME CASING

CROSS-REFERENCE TO RELATED APPLICATION

This application claims priority based on provisional application Ser. No. 60/344,701, filed Dec. 26, 2001.

BACKGROUND OF THE INVENTION

1. Field of Invention

This invention relates to the conversion of chemical energy to electrical energy. In particular, the present invention relates to a cathode design having a first cathode active material of a relatively low energy density but of a relatively high rate capability and a second cathode active material having a relatively high energy density but of a relatively low rate capability. The first and second cathode active materials are contacted to their own current collectors. However, the cathode current collectors are all connected to a common terminal lead. A preferred form of the cell has the cathode terminal lead insulated from the casing serving as the negative terminal for the anode electrode. The present cathode design is useful for powering an implantable medical device requiring a high rate discharge application.

2. Prior Art

The capacity of an electrochemical cell is not only dependent on the electrode assembly design and packing efficiency, it also is dependent on the type of active materials used. For example, it is generally recognized that for lithium cells, silver vanadium oxide (SVO) and, in particular, ε-phase silver vanadium oxide ($AgV_2O_{5.5}$), is preferred as the cathode active material. This active material has a theoretical volumetric capacity of 1.37 Ah/ml. By comparison, the theoretical volumetric capacity of $CF_x$ material (x=1.1) is 2.42 Ah/ml, which is 1.77 times that of ε-phase silver vanadium oxide. For powering a cardiac defibrillator, SVO is preferred because it can deliver high current pulses or high energy within a short period of time. Although $CF_x$, has higher volumetric capacity, it cannot be used in medical devices requiring a high rate discharge application due to its low to medium rate of discharge capability.

An attempt to use high capacity materials, such as $CF_x$, by mixing it with a high rate cathode material, such as SVO, is reported in U.S. Pat. No. 5,180,642 to Weiss et al. However, electrochemical cells made from such cathode composites have lower rate capability. The benefit of increasing the cell theoretical capacity by using $CF_x$, as part of the cathode mix is in part canceled by the lowering of its power capability in a high rate discharge application.

Another way to address the longevity issue is described in U.S. Pat. No. 5,614,331 to Takeuchi et al., which is assigned to the assignee of the present invention and incorporated hereby by reference. In this patent, a method of using a medium rate $CF_x$ cell to power the circuitry of an implantable defibrillator while simultaneously using a SVO cell to provide the power supply under high rate application for the device is described. The advantage of this method is that all of the high power SVO energy is reserved for the high power application such as charging a capacitor while the device monitoring function, for example monitoring the heart beat, which require generally low power requirements, is provided by the high capacity $CF_x$ system. This battery construction requires a very careful design to balance the capacities of the high power cell (SVO) and the low power cell ($CF_x$) with both cells reaching end of service life at or near the same time. Such a balance, nevertheless, is very difficult to achieve due to the variable device usage requirements of a particular patient.

SUMMARY OF THE INVENTION

As is well known by those skilled in the art, an implantable cardiac defibrillator is a device that requires a power source for a generally medium rate, constant resistance load component provided by circuits performing such functions as, for example, the heart sensing and pacing functions. From time-to-time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected.

Accordingly, the object of the present invention is to improve the performance of lithium electrochemical cells by providing a new concept in electrode design. Further objects of this invention include providing a cell design for improving the capacity and utilization efficiency of defibrillator batteries, and to maintain the high current pulse discharge capability throughout the service life of the battery.

To fulfill these needs, a new cathode design is provided having a first cathode active material of a relatively low energy density but of a relatively high rate capability, for example SVO, short circuited with a second cathode active material having a relatively high energy density but of a relatively low rate capability, for example $CF_x$. The first and second cathode active materials are contacted to their own current collectors. Then, the current collectors are connected to a common terminal lead. Preferably, the common cathode terminal lead is insulated from the casing serving as the anode or negative electrode terminal. This cell construction provides a design that is particularly well suited for powering an implantable medical device, especially one that from time to time may require a high current pulse discharge. An exemplary device is a cardiac defibrillator.

These and other objects of the present invention will become increasingly more apparent to those skilled in the art by reference to the following description and to the appended drawings.

DETAILED DESCRIPTION OF THE PREFERRED EMBODIMENTS

Figure 1:
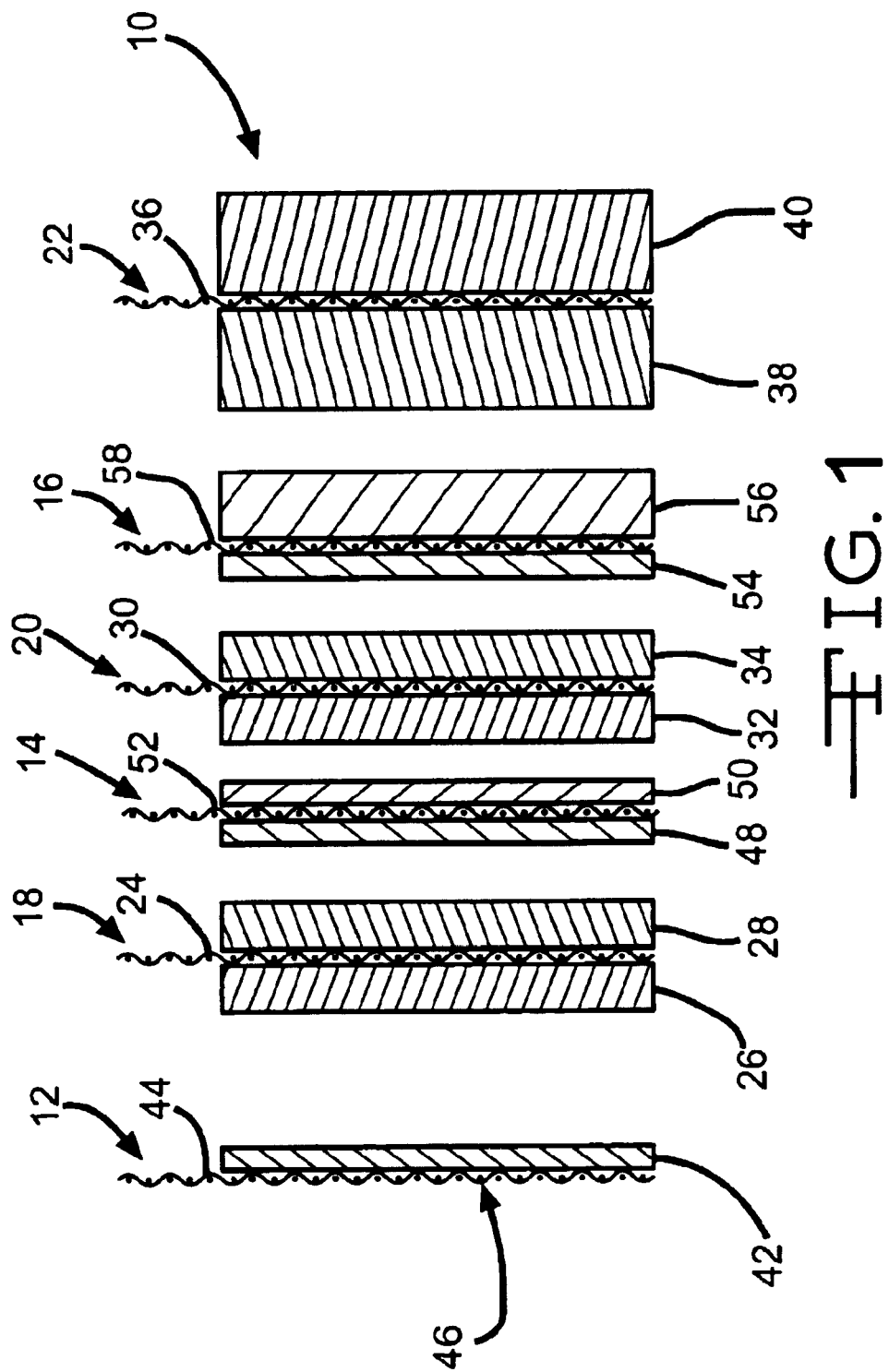
FIG. 1 is a schematic of one embodiment of a cell 10 according to the present invention.

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses (23.2 mA/cm$^2$) with a 15 second rest between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials and the electrochemical reaction at the cathode involves conversion of ions that migrate from the anode to the cathode into atomic or molecular forms. The solid cathode may comprise a first active material of a metal element, a metal oxide, a mixed metal oxide and a metal sulfide, and combinations thereof and a second active material of a carbonaceous chemistry. The metal oxide, the mixed metal oxide and the metal sulfide of the first active material has a relatively lower energy density but a relatively higher rate capability than the second active material.

The first active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof. For a more detailed description of such cathode active materials reference U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_{0.5}V_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

The cathode design of the present invention further includes a second active material of a relatively high energy density and a relatively low rate capability in comparison to the first cathode active material. The second active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.2 and 1.2, and $(C_2F)_n$ wherein the n refers to the number of monomer units which can vary widely. The true density of $CF_x$ is 2.70 g/ml and its theoretical capacity is 2.42 Ah/ml.

In a broader sense, it is contemplated by the scope of the present invention that the first cathode active material is any material that has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material. And, in addition to fluorinated carbon, $Ag_2O$, $Ag_2O_2$, CuF, $Ag_2CrO_4$, $MnO_2$, and even SVO itself, are useful as the second active material. The theoretical volumetric capacity (Ah/ml) of $CF_x$ is 2.42, $Ag_2O_2$ is 3.24, $Ag_2O$ is 1.65 and $AgV_2O_{5.5}$ is 1.37. Thus, $CF_x$, $Ag_2O_2$, $Ag_2O$, all have higher theoretical volumetric capacities than that of SVO.

Before fabrication into an electrode structure for incorporation into an electrochemical cell according to the present invention, the first and second cathode active materials prepared as described above are preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoropolymer binder present at about 3 weight percent, a conductive diluent present at about 3 weight percent and about 94 weight percent of the cathode active material.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum and gold. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

FIG. 1 is a schematic view of an exemplary electrochemical cell 10 according to the present invention. The cell 10 is housed in a conductive casing (not shown) in a case-negative design. In that respect, the anode electrode comprises a number of anode structures; each comprising a current collector having an alkali metal contacted thereto, lithium being preferred. In this embodiment, there are three anode structures 12, 14 and 16 disposed adjacent to at least one of the cathode structures 18, 20 and 22. The first cathode structure 18 comprises a first conductive current collector 24 provided with layers 26 and 28 of the first cathode active material, preferably SVO, contacted to its opposed major sides. Similarly, the second cathode structure 20 comprises a second conductive current collector 30 provided with layers 32 and 34 of SVO contacted to its opposed major sides. The third cathode structure 22 comprises a third conductive current collector 36 provided with layers 38 and 40 of the second cathode active material, preferably $CF_x$, contacted to its opposed major sides.

The cell 10 is built with the first anode structure 12 having lithium 42 only contacted to the one major side of the anode current collector 44 adjacent to the first cathode structure 18. The opposite major side 46 of the anode current collector 44 is bare and in direct contact with the casing serving as the anode electrode terminal in the case-negative cell design. The second anode structure 14 is intermediate the first and second cathode structures 18, 20 and comprises layers 48 and 50 of lithium contacted to the opposed major sides of current collector 52. The third anode structure 16 is disposed intermediate the second and third cathode structures 20, 22 and comprises lithium layers 54 and 56 contacted to the opposed major sides of current collector 58. The anode layers 42, 48, 50 and 54 are of substantially the same size and thickness. However, layer 56 adjacent to the third cathode structure 22 of $CF_x$ is significantly thicker than the other layers of the anode structures 12, 14 and 16.

The cathode current collectors 24, 30 and 36 are connected to a common terminal insulated from the casing by a suitable glass-to-metal seal. This describes a case-negative cell design, which is the preferred form of the cell. The cell 10 can also be built in a case-positive design with the cathode current collectors contacted to the casing and the anode current collectors 44, 52 and 58 connected to a common terminal lead insulated from the casing.

An important aspect of the invention is that the capacity of the lithium layers 42, 48, 50 and 54 is equal to or greater than the facing cathode active layers 26, 28, 32 and 34.

Similarly, the capacity of the lithium layer 56 is equal to or greater than the cathode active layers 38, 40 that it faces. According to the present invention, about 7.0 equivalents of lithium are required to completely discharge one equivalent of SVO. Since the theoretical capacity of $CF_x$ is about 1.77 times that of SVO, the cell 10 is depicted with $CF_x$ having a greater size and thickness than the SVO plates. As discussed above, between about 0.2 to about 1.2 equivalent of lithium is required to completely discharge 1 equivalent of $CF_x$. In that respect, in order to determine the cell's anode to cathode (A/C) capacity ratio, the amounts of both SVO and $CF_x$ are added up to determine how much lithium is required. The capacity of lithium is equal to or greater than the sum of SVO and $CF_x$. For a more detailed discussion of the anode/cathode capacity relationship of a Li/SVO cell, reference is made to U.S. Pat. No. 6,171,729 to Gan et al. This patent is assigned to the assignee of the present invention and incorporated herein by reference.

In an alternate embodiment, the cell comprises another unit of the lithium/SVO assembly of structures 12, 18, 14, 20 and 26 positioned on the opposite side of cathode structure 22. As with the embodiment shown in FIG. 1, this alternate construction has an anode current collector contacted to the casing (not shown).

Figure 2:
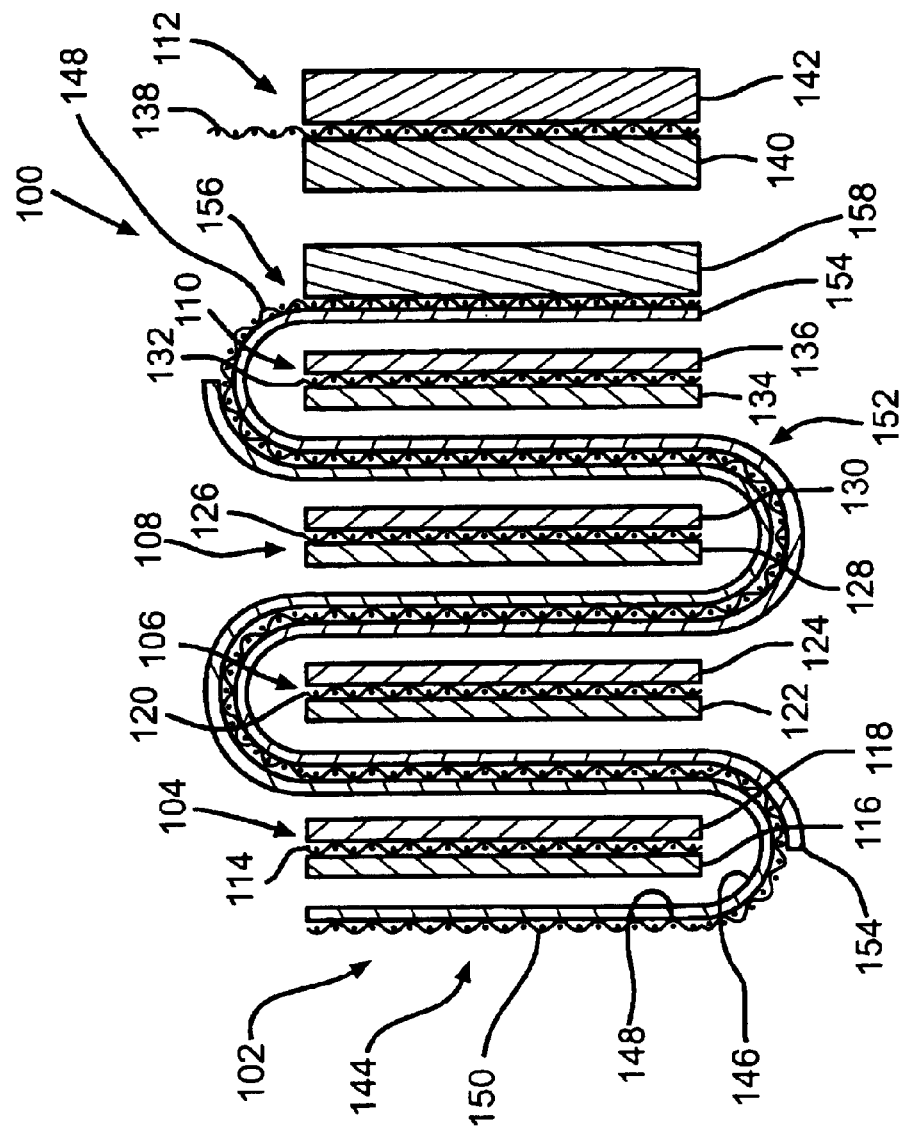
FIG. 2 is a schematic of another embodiment of a cell 100 according to the present invention.

FIG. 2 is a schematic view of another electrochemical cell 100 according to the present invention. As is the cell described in FIG. 1, this cell 100 is housed in a conductive casing (not shown) in a case-negative design. In that respect, the anode electrode comprises an anode current collector 102 having an alkali metal contacted thereto. The preferred alkali metal is lithium, and it is provided in a serpentine shape weaving or winding between cathode structures 104, 106, 108, 110, and 112.

The first cathode structure 104 comprises a first conductive current collector 114 provided with layers 116 and 118 of SVO contacted to its opposed major sides. The second cathode structure 106 comprises a second conductive current collector 120 provided with layers 122 and 124 of SVO contacted to its opposed major sides. The third cathode structure 108 comprises a third conductive current collector 126 provided with layers 128 and 130 of SVO contacted to its opposed major sides. The fourth cathode structure 110 comprises a fourth conductive current collector 132 provided with layers 134 and 136 of SVO contacted to its opposed major sides. Finally, the fifth cathode structure 112 comprises a fifth conductive current collector 138 provided with layers 140 and 142 of $CF_x$ contacted to its opposed major sides. The SVO layers 116, 118, 122, 124, 128, 130, 134 and 136 are of substantially the same size and thickness. The two $CF_x$ layers 140 and 142 are themselves of substantially the same size and thickness.

The cell 100 is built with the anode portion 144 having lithium 146 only contacted to the one major side 148 of the anode current collector 102 adjacent to the first cathode structure 104. The opposite major side 150 of the anode current collector 102 is bare and in direct contact with the casing serving as the anode electrode terminal in the case-negative cell design. At the bend between cathode structures 104 and 106, the serpentine anode electrode doubles back to provide anode portion 152 having the lithium 146 contacting the current collector side 148 and a layer of lithium 154 contacted to the other major side 150 of the current collector. The anode portion 152 continues weaving between the cathode structures 106, 108, and then between the cathode structures 108, 110. At the bend between the SVO cathode structure 110 and the $CF_x$ cathode structure 112, the lithium layer 146 ends. Then, the anode electrode is completed by anode portion 156 comprising lithium layers 154 and 158 contacted to its opposed major sides. Anode layers 146 and 154 are of substantially the same size and thickness. However, lithium layer 158 adjacent to the fifth cathode structure 112 of $CF_x$ is significantly thicker.

Cell 100 has the capacity of the lithium portions 146 and 154 being equal to or greater than that of the cathode plates 116, 118, 122, 124, 128, 130, 134 and 136. Similarly, the capacity of the lithium portion 158 is equal to or greater than that of the $CF_x$ layers 140 and 142. As is the case with cell 10 of FIG. 1, the anode to cathode (A/C) capacity ratio of cell 100 is determined by adding the amounts of both SVO and $CF_x$ to determine how much lithium is required. The capacity of lithium is equal to or greater than the sum of SVO and $CF_x$.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

According to the present invention, SVO cathode material, which provides a relatively high power or rate capability but a relatively low energy density or volumetric capability and $CF_x$ cathode material, which has a relatively high energy density but a relatively low rate capability, are individually pressed on current collector screens.

Since $CF_x$ material has significantly higher volumetric capacity than that of SVO material, i.e., approximately 1.77 times greater, in order to optimize the final cell capacity, the amount of $CF_x$ material should be maximized and the amount of SVO material used in each electrode should be minimized to the point that it is still practical in engineering and acceptable in electrochemical performance.

Further, end of service life indication is the same as that of a standard Li/SVO cell. And, it has been determined that the SVO electrode material and the $CF_x$ electrode material according to the present invention reach end of life at the same time. This is the case in spite of the varied usage in actual defibrillator applications. Since both electrode materials reach end of service life at the same time, no energy capacity is wasted.

The corrosion resistant glass used in the glass-to-metal seals has up to about 50% by weight silicon such as CABAL 12, TA 23, FUSITE 425 or FUSITE 435. The positive terminal leads preferably comprise titanium although molybdenum, aluminum, nickel alloy, or stainless steel can also be used. The cell casing is a open container hermetically sealed with a lid typically of a material similar to that of the casing.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode of an alkali metal connected to a first terminal;
   b) a cathode of a first cathode active material having a relatively low energy density but a relatively high rate capability contacted to a first cathode current collector and a second cathode active material different than the first and having a relatively high energy density but a relatively low rate capability contacted to a second cathode current collector, wherein the first and second current collectors are connected to a second terminal common to both of them; and
   c) a nonaqueous electrolyte activating the anode and the cathode.

2. The electrochemical cell of claim 1 wherein the first cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide, and mixtures thereof and wherein the second cathode active material is selected from the group consisting of $CF_x$, $Ag_2O$, $Ag_2O_2$, CuF, $Ag_2CrO_4$, $MnO_2$, and mixtures thereof.

3. The electrochemical cell of claim 1 wherein the first and second cathode current collectors are selected from the group consisting of stainless steel, titanium, tantalum, platinum, and gold.

4. The electrochemical cell of claim 1 wherein the anode is lithium, the first cathode active material is silver vanadium oxide, the second cathode active material is $CF_x$ and the first and second cathode current collectors are titanium having a graphite/carbon material coated thereon.

5. The electrochemical cell of claim 1 wherein the alkali metal is positioned between the first cathode active material and the second cathode active material.

6. The electrochemical cell of claim 5 wherein the alkali metal is in the form of at least one plate contacted to an anode current collector.

7. The electrochemical cell of claim 6 wherein the alkali metal has a serpentine shape weaving between at least two plates of one of the first and the second cathode active materials and between one plate of the other of the first and second cathode active materials.

8. The electrochemical cell of claim 1 wherein the anode is connected to a casing for the cell serving as the first terminal and the first and the second cathode current collectors are connected to common terminal lead insulated from the casing.

9. The electrochemical cell of claim 1 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

10. The electrochemical cell of claim 1 wherein the electrolyte comprises at least one solvent selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

11. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

12. The electrochemical cell of claim 1 wherein a first portion of the anode comprising the alkali metal faces the first cathode active material and a second portion of the anode faces the second cathode active material and wherein the second portion of the anode is thicker than the first portion.

13. The electrochemical cell of claim 1 wherein a first portion of the anode comprising the alkali metal faces the first cathode active material and a second portion of the anode faces the second cathode active material and wherein a capacity of both the first and second portions of the anode is equal to or greater than that of the facing first and second cathode active materials, respectively.

14. The electrochemical cell of claim 1 wherein the first and second cathode current collectors are connected to a casing for the cell serving as the first terminal and the anode is connected to a terminal lead insulated from the casing.

15. An electrochemical cell, which comprises:
a) an anode comprising lithium connected to a first terminal;
b) a cathode of silver vanadium oxide contacted to a first cathode current collector and fluorinated carbon contacted to a second cathode current collector, wherein the first and second cathode current collectors are connected to a second terminal common to both of them; and
c) a nonaqueous electrolyte activating the anode and the cathode.

16. The electrochemical cell of claim 15 wherein the lithium is positioned between the first cathode active material and the second cathode active material.

17. The electrochemical cell of claim 15 wherein the lithium is in the form of at least one plate contacted to an anode current collector.

18. The electrochemical cell of claim 17 wherein the lithium has a serpentine shape weaving between at least two plates of one of the first and the second cathode active materials and between one plate of the other of the first and second cathode active materials.

19. The electrochemical cell of claim 17 wherein the anode is connected to a casing for the cell serving as the first terminal and the first and the second cathode active materials are connected to a common terminal lead insulated from the casing.

20. The electrochemical cell of claim 15 wherein the capacity of the lithium anode is equal to or greater than the combined capacity of the silver vanadium oxide and the fluorinated carbon.

21. An electrochemical cell, which comprises:
a) a lithium anode connected to a first terminal;
b) a cathode of a first cathode active material selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide, and mixtures thereof, short circuited with a second cathode active material different than the first and selected from the group consisting of $CF_x$, $Ag_2O$, $Ag_2O_2$, CuF, $Ag_2CrO_4$, $MnO_2$, and mixtures thereof, wherein the first and second cathode active materials are connected to a second terminal common to both of them; and
c) a nonaqueous electrolyte activating the anode and the cathode.

22. The electrochemical cell of claim 21 wherein the first cathode active material is contacted to a first cathode current collector and the second cathode active material is contacted to a second cathode current collector.

23. The electrochemical cell of claim 22 wherein the anode is connected to a casing for the cell serving as the first terminal and the first and the second cathode active materials are connected to a common terminal lead insulated from the casing.

24. A method powering an implantable medical device, comprising the steps of:
a) providing the medical device;
b) providing an electrochemical cell comprising the steps of:
i) providing an anode of an alkali metal connected to a first terminal;
ii) providing a cathode of a first cathode active material having a relatively low energy density but a rela tively high rate capability short circuited with a second cathode active material different than the first and having a relatively high energy density but a relatively low rate capability, wherein the first and second cathode active materials are connected to a second terminal common to both of them; and iii) activating the anode and cathode with a nonaqueous electrolyte; and c) electrically connecting the electrochemical cell to the medical device as its power source.

25. The method of claim 24 including contacting the first cathode active material to a first cathode current collector and the second cathode active material to a second cathode current collector.

26. The method of claim 25 including connecting the anode to a casing for the cell serving as the first terminal and connecting the first and second cathode current collectors to a common terminal lead insulated from the casing.

27. The method of claim 24 including positioning the alkali metal between the first cathode active material and the second cathode active material.

28. The method of claim 24 including providing the alkali metal in the form of at least one plate contacted to an anode current collector.

29. The method of claim 24 including providing the alkali metal having a serpentine shape weaving between at least two plates of one of the first and the second cathode active materials and between one plate of the other of the first and second cathode active materials.

30. The method of claim 24 including selecting the first cathode active material from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide and mixtures thereof and the second cathode active material from the group consisting of $CF_x$, $Ag_2O$, $Ag_2O_2$, CuF, $Ag_2CrO_4$, $MnO_2$, and mixtures thereof.

31. The method of claim 24 wherein the anode is lithium, the first cathode active material is silver vanadium oxide, and the second cathode active material is $CF_x$.

* * * * *